Dec. 6, 1949     C. W. LEGUILLON ET AL     2,490,692
APPARATUS FOR SPLICING STRIP MATERIAL
Filed Aug. 19, 1947     3 Sheets-Sheet 1

Inventors
Charles W. Leguillon
Frank Slusher

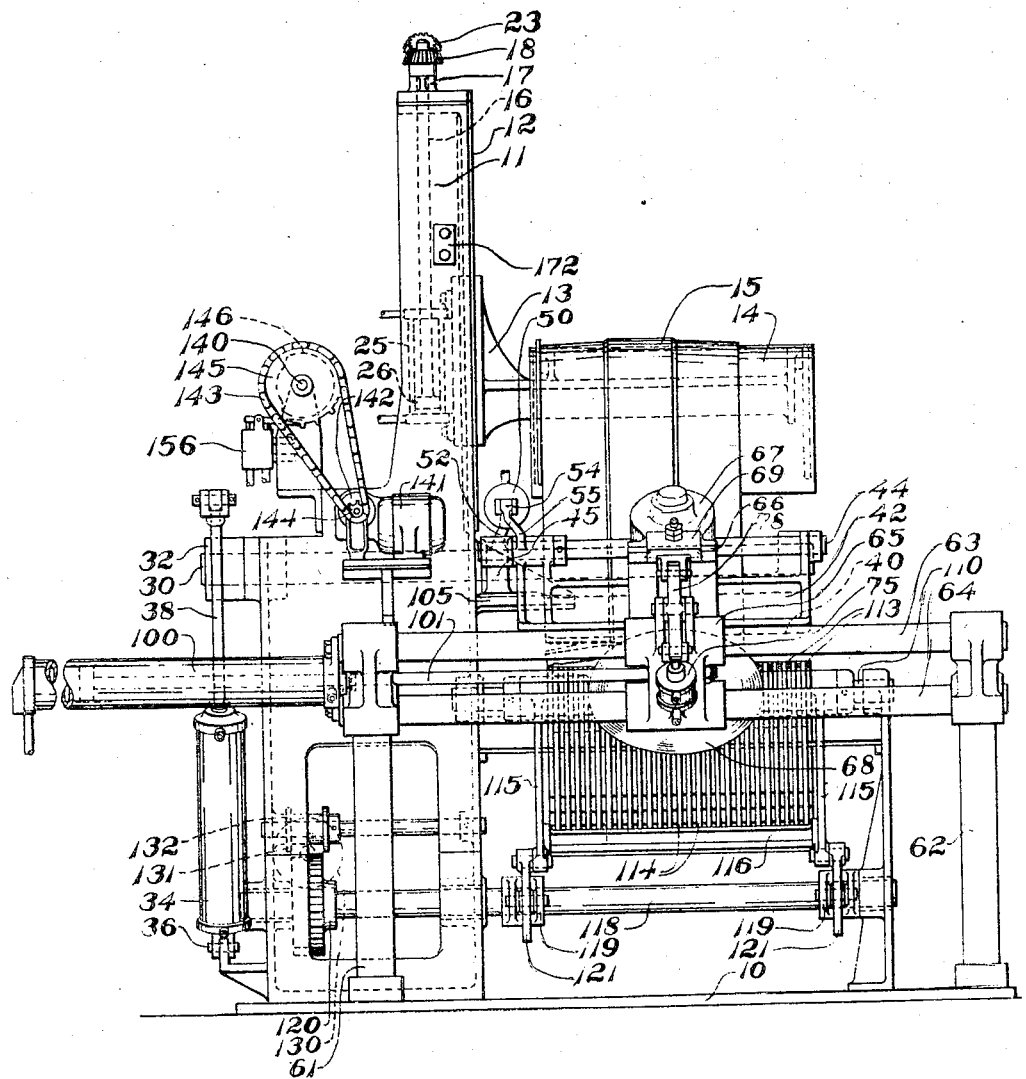

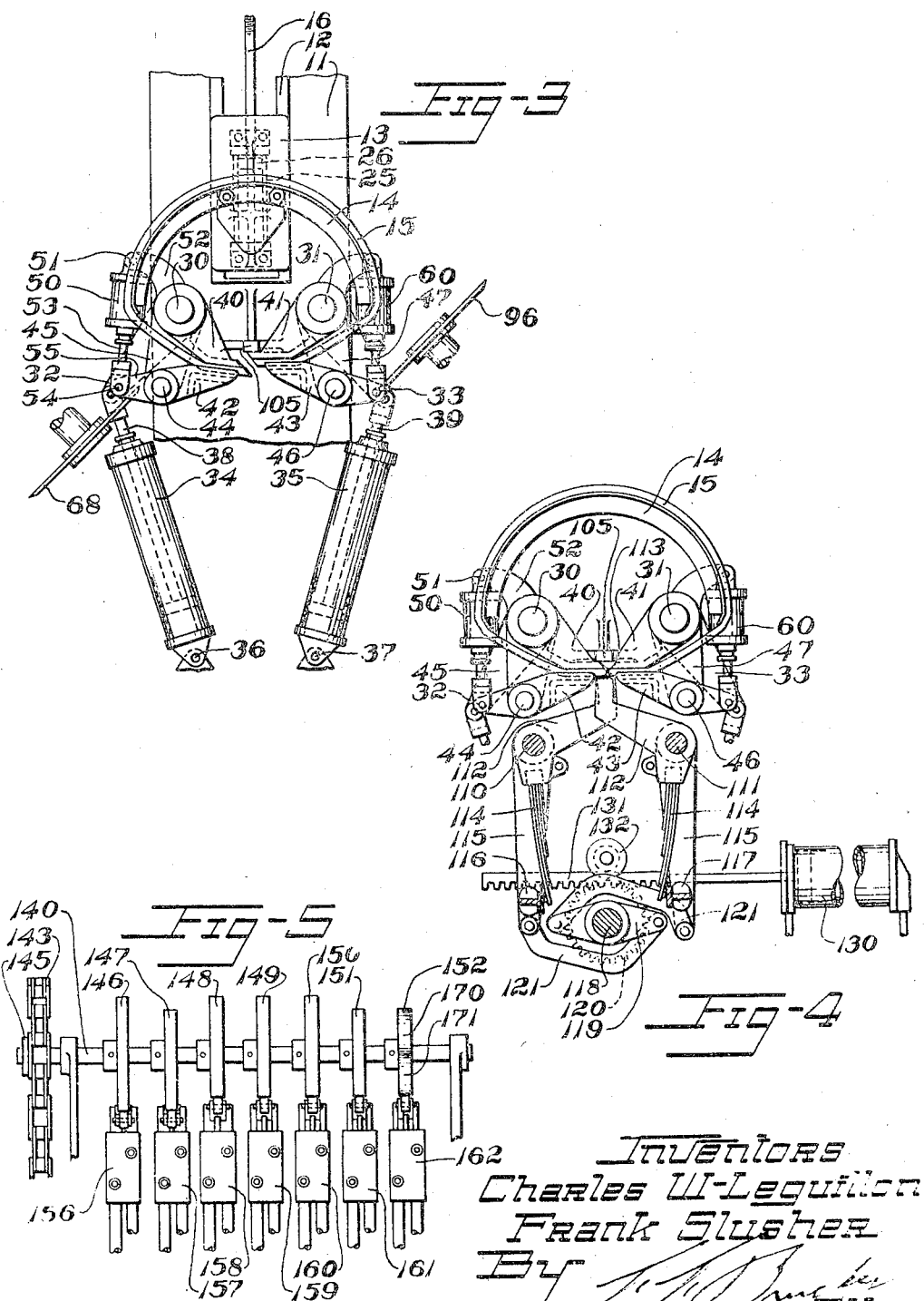

Patented Dec. 6, 1949

2,490,692

UNITED STATES PATENT OFFICE 2,490,692

APPARATUS FOR SPLICING STRIP MATERIAL

Charles W. Leguillon, Akron, Ohio, and Frank Slusher, Carpinteria, Calif., assignors to The B. F. Goodrich Company, New York, N. Y., a corporation of New York Application August 19, 1947, Serial No. 769,414

16 Claims. (Cl. 154—42)

1

This invention relates to apparatus for splicing the ends of plastic rubber-like strips of material to provide endless bands and the invention is especially useful in the splicing of tread slabs for the manufacture of tires.

It is an object of the invention to provide for holding the strip of material, cutting it to the required length while providing scarfed ends, bringing the ends into contact, and firmly pressing the material at the splice.

More specific objects are to provide for cutting and splicing a tread slab to the desired circumferential length without undesirably stretching or otherwise distorting the slab material, and to provide for effecting these results at a single station and while the slab is positioned upon a support.

Other objects are to provide for splicing bands of a range of circumferences, to provide automatic handling of the strip between the cutting and splicing operations and thereby to avoid contamination by handling, to provide uniformity of splicing regardless of differences in thickness of the material, and to provide uniformity of circumference of successive bands at a single adjustment.

These and other objects will appear from the following description and the accompanying drawings.

Of the drawings,

Fig. 2 is a side elevation thereof.

Fig. 3 is a detail front elevation thereof showing the clamping members with the scarfed ends of the strip moved substantially into splicing position, parts being broken away.

Fig. 4 is a detail front elevation thereof in the splice pressing position, parts being broken away.

Fig. 5 is a detail view of timing mechanism for operating the apparatus.

Figure 1:
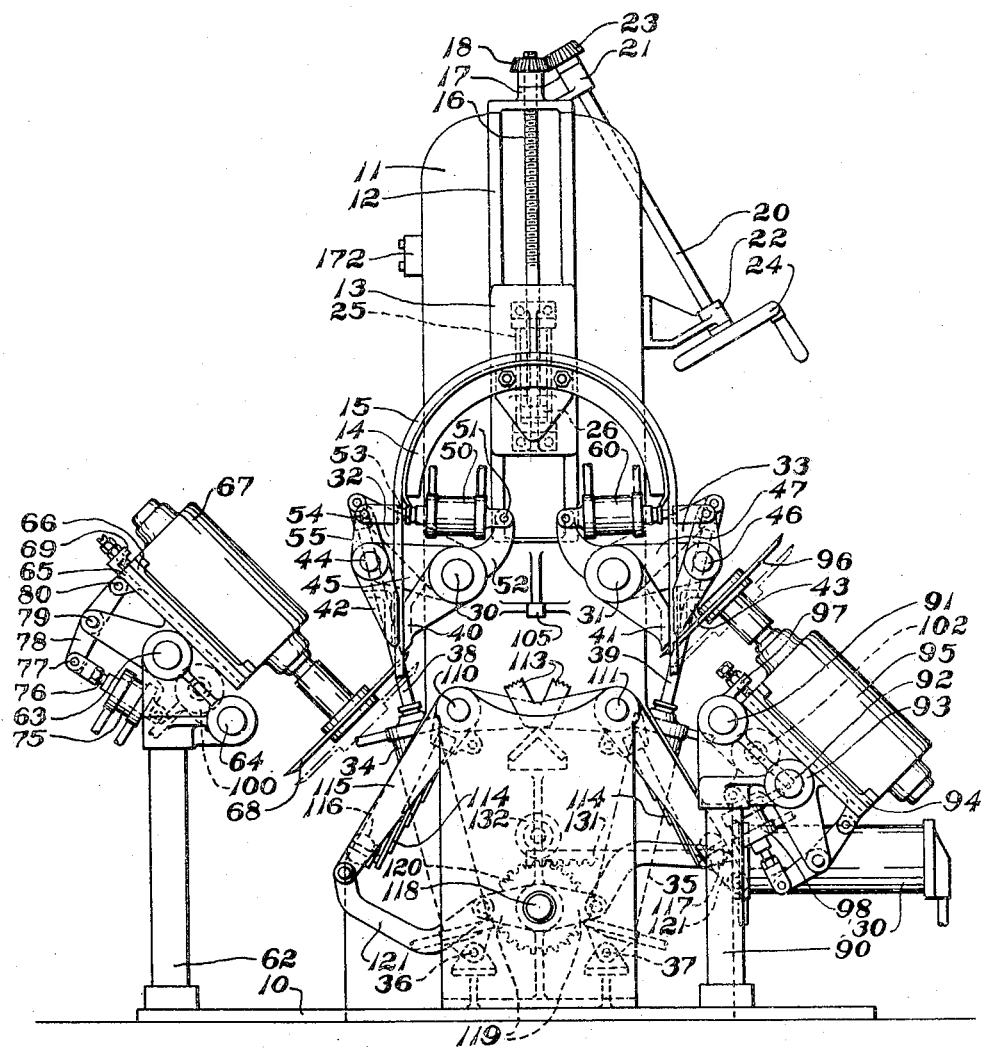
Fig. 1 is a front elevation of apparatus constructed in accordance with and embodying the invention with the apparatus in cutting position.

Referring to the drawings, the numeral 10 designates a base plate to which is secured a frame 11 having a vertical guideway 12 upon which a carriage 13 is mounted for vertical movement. The carriage supports a saddle 14 of semi-cylindrical shape over which the strip to be spliced, such as the tread strip 15, is draped, with its ends hanging downwardly at each side of the saddle.

For adjustably supporting the carriage, a vertical adjusting screw 16 is journaled in a bearing 17 at the top of the frame and has a bevel gear 18 secured thereto. A shaft 20 inclined to shaft

2

16 is rotatably mounted in brackets 21, 22 on the frame. A pinion 23 is secured to shaft 20 and meshes with gear 18. A handwheel 24 is also fixed to the wheel. Mounted on the carriage 13 is a double acting fluid pressure operated cylinder 25, the piston 26 of which is fixed to the screw 16. The arrangement is such that by rotating handwheel 24 the saddle 14 may be adjusted vertically to adjust the apparatus for making bands of different circumference, while at each setting, the saddle may be raised and lowered a fixed distance for a purpose hereinafter described.

The invention contemplates the provision of means to clamp the ends of the strip so that they may be trimmed. For this purpose a pair of horizontal parallel shafts 30, 31 are journaled in the frame and each has an arm 32 or 33 fixed thereto. A pair of double acting fluid pressure operated cylinders 34, 35 are pivotally mounted as at 36, 37 to the frame and have piston rods 38, 39 respectively pivoted to arms 32, 33. Clamp jaws 40, 41 are fixed respectively to shafts 30, 31. Clamp jaws 42, 43 are movably mounted with respect to jaws 40, 41 respectively, and for this purpose, jaw 42 is pivotally mounted on a shaft 44 carried by an arm 45 fixed to shaft 30 and jaw 43 is similarly pivoted on shaft 46 carried by an arm 47 fixed to shaft 31. A double acting pressure fluid operated cylinder 50 is pivotally mounted, as at 51, on an arm 52 fixed to jaw 40, and its piston rod 53 is pivotally connected, as at 54, to an arm 55 fixed to jaw 42. The arrangement is such that cylinder 50 may open and close jaws 40, 42 regardless of the rotative position of shaft 30. A cylinder 60 is provided for operating jaws 41, 43 in the same manner.

For trimming one clamped end of the strip a pair of pedestals 61, 62 secured to base plate 10 support a pair of parallel rods 63, 64, on which a carriage 65 is slideably mounted. Carriage 65 has vertically inclined ways in which a second carriage 66 is slideably mounted. Carriage 66 has an electric motor 67 fixed thereto and a rotatable knife cutter 68 is mounted on the motor spindle. An adjustable stop 69 limits upward movement of the cutter and may be adjusted so that the knife just clears the clamping jaws 40, 42 in the cutting stroke.

For lowering the cutter so as to clear the cut strip on the return stroke, a double acting pressure fluid operated cylinder 75 is pivotally mounted on the carriage. Its piston rod 76 is pivotally connected, as at 77, to one end of a lever 78, fulcrumed at 79 on the carriage 65. The other end of the lever is pivotally connected, as at 77, to one end of a lever 85. The other end of the lever is pivotally connected, as at 80, to carriage 66.

For trimming the opposite end of the strip, a pair of pedestals such as 90 similarly support rods 91, 92 which guide a carriage 93 horizontally. A second carriage 94 is slideably mounted on carriage 93 for inclined movement and carries an electric motor 95 having a circular cutter 96. In its upper position, carriage 94 is limited by a stop 97, and a fluid operated cylinder 98 is provided to move the carriage up and down the incline in the same manner as the opposite cutter.

For controlling transverse movement of the cutter, a double acting fluid pressure operated cylinder 100 is secured to pedestal 61, and its piston rod 101 is secured to carriage 65 to move cutter 68 across the strip. A similar cylinder 102 is provided to move carriage 93 and with it cutter 96.

The arrangement of the clamping jaws on the shafts 30, 31 permits the jaws to be moved toward each other by operation of cylinders 34, 35 until the ends of the strip 15 are in contact, as in Fig. 4, the jaws at this position being backed by a stop 105 on the frame 11. In order to prevent stretching of the strip in accomplishing such movement of the jaws, the saddle 14 is held by cylinder 25 in its upper position while clamping of the jaws and cutting of the ends takes place, and the saddle is then lowered in advance of the swinging movement of the jaws to provide slack in the strip.

The invention includes means for pressing the abutting scarfed ends of the strip and for this purpose a pair of horizontal shafts 110, 111 are fixed to the frame 11 and upon each shaft are pivotally mounted a plurality of pressing members 112 (see Fig. 4). Each pressing member is independent of the others, and each has an upwardly directed presser foot 113 having a serrated face for contacting the spliced strip. Each pressing member has a depending leaf spring 114, and the pressing members on opposite shafts are arranged in intercallating relation to each other.

For operating the pressing members, a pair of depending arms 115 are pivotally mounted on each shaft 110 and 111 and the pairs of arms are connected by bars 116, 117 which engage the free ends of the leaf springs. A rock shaft 118 is journaled in frame 11 and has a pair of rocker arms 119 and a gear 120 fixed thereto. Links 121 connect the end of the rocker arms 119 to the arms 115. The arrangement is such that rotation of the rock shaft through 180 degrees will raise the presser feet 113 against the splice and due to the leaf spring mounting of the presser feet they will contact the strip regardless of variation in thickness of the strip throughout its width.

For operating the rock shaft 118, a double acting pressure fluid operated cylinder 130 is fixed to the frame 11 and its piston rod is fixed to a rack 131 meshing with gear 120 and guided by a free running roller 132.

While the valves controlling the various fluid operated cylinders may be controlled by hand, for convenience of operation and to reduce the amount of skill required of the operator, a valve control may be incorporated in the apparatus. For this purpose, a cam shaft 140 is adapted to be driven by a motor 141 through a speed reducer 142, a chain 143, and sprockets 144, 145. A series of cams 146, 147, 148, 149, 150, 151 and 152 are fixed to the cam shaft so as to control the followers of four-way valves 156, 157, 158, 159, 160, 161 and 162 respectively, the arrangement being such that one revolution of the cam shaft completes a cycle of the apparatus. Each valve is connected to a fluid pressure supply line and an exhaust line and its other ports are connected respectively to opposite ends of the described operating cylinders by flexible tubing (not shown). Valve 156 controls cylinders 50, 60 in unison. Valve 157 controls cylinders 75, 98, 102 and 100 in unison. Valve 158 controls cylinder 25. Valve 159 controls valve cylinder 35. Valve 160 controls cylinder 34. This arrangement of separate valves for cylinders 35 and 34 permits raising of jaws 41, 43 in advance of raising of jaws 40, 42 as shown in Fig. 3 as due to the scarfed arrangement of the ends of the strips and the jaws, jaws 41, 43 should be raised first and lowered last. Valve 161 controls cylinder 130. Valve 162 controls a switch which stops motor 141 to end the cycle. The cam 152 has two humps 170, 171 each of which depresses valve 162 to stop motor 141 and with it the cam shaft at two positions, one at 290 degrees rotation of the cam shaft and the other at 360 degrees rotation thereof. At the stopping positions, the motor may be restarted independent of the valve 162 by the operator depressing a starting button of a manual control switch 172 while the hump of the cam 152 passes the stopping position with respect to the valve.

Valve 156 in its normal position admits fluid under pressure to the rod ends of cylinders 50, 60 holding the clamps open. As the cam 146 starts to rotate, it opens the rod ends of these cylinders to exhaust and admits fluid to the opposite ends of the cylinders to clamp the strip. Clamping is maintained during the first 290 degrees of cam rotation.

Valve 157 in its normal position admits fluid under pressure to the rod ends of cylinders 100, 102 to hold carriages 65, 93 in their retracted postion, and to rod end of cylinder 98 and the head end of cylinder 75 to hold the knife blades in a non-cutting position. Upon 60 degrees rotation of cam 147 from starting position the connections to these cylinders are reversed to advance the cutters across the strip with the blade in the full line position of Fig. 1 and after 185 degrees of cam rotation, the cutters are returned to their normal positions.

Valve 158 in its normal position admits fluid to the upper or rod end of cylinder 25 to hold the saddle in raised position. Upon rotation of cam 148 through 30 degrees from starting position, valve 158 admits fluid to the opposite end of cylinder 25 to lower the saddle. This continues until the cam has travelled 340 degrees whereupon it raises the saddle.

Valve 159 in its normal position admits fluid to the lower end of cylinder 35 holding clamp jaws 41, 43 vertical. At 190 degrees of rotation of cam 149 from starting position valve 159 admits fluid to the upper end of cylinder 35 to rotate jaws 41, 43 to the splicing position of Fig. 3, and at 340 degrees of cam rotation returns the jaws to vertical position.

Valve 161 normally admits fluid to the rod end of cylinder 130 to hold the pressing members in the lowered position of Fig. 1. At 215 degrees of rotation of cam 151 from starting position valve 161 is recessed, admitting fluid to the opposite end of cylinder 130 and at 290 degrees of rotation the valve is released and returns the pressing members to their lowered position.

The operation of the apparatus is as follows: With the motor 141 not running, the saddle 114 is in its raised position, the splicing members 113 are in lowered position, the cutters 68, 96 are in their lowered dotted line positions, the clamping jaws are vertical and open, and the carriages 65, 93 are retracted. The operator hangs a strip 15 of material across the saddle with its ends hanging between clamping jaws. After starting motors 67, 95 the operator presses the starting button of switch 172. Thereafter motor 141 starts rotating cam shaft 140. First the clamp jaws 40, 42 and 41, 43 are closed against the strip, then the cutters 68, 96 are raised and traverse the strip trimming the ends and return to their original positions, then the saddle 14 is lowered. Next the jaws swing to splicing position, jaws 41, 43 slightly in advance of jaws 40, 42. Next the pressing members 113 are pressed against the spliced material and then lowered. At this position clamps 40, 41, 42, 43 open and the apparatus stops. The operator then removes a spliced band and presses the starting button a second time, whereupon the cam shaft continues rotation, the parts are returned to their normal positions and the apparatus again stops ready for insertion of another strip.

Variations may be made without departing from the scope of the invention as it is defined by the following claims.

We claim:

1. Apparatus for splicing a strip of plastic material to provide an endless band, said apparatus comprising means for holding opposite ends of a strip with said ends out of alignment, means for trimming the strip at the held ends, means for swinging the held ends of the trimmed strip into alignment with each other and for splicing the same.

2. Apparatus for splicing a strip of plastic material to provide an endless band, said apparatus comprising means for holding opposite ends of a strip, means inclined relative to the strip for trimming the ends of the strip to provide scarfed ends, means for moving said ends into overlapping abutting relation, and means for pressing together the overlapped portions to splice the same.

3. Apparatus for splicing a strip of plastic material to provide an endless band, said apparatus comprising means for supporting the strip with its ends downwardly depending, means for clamping the depending ends of the strip, means inclined relative to the clamped ends for trimming the ends of the strip to provide scarfed portions, means for swinging the clamping means with the scarfed ends of the strip into overlapping abutting relation, and means for pressing together the overlapping ends of the strip to splice the same.

4. Apparatus for splicing a strip of plastic material to provide an endless band, said apparatus comprising means for supporting the strip with its ends downwardly depending, means for clamping the depending ends of the strip, means for trimming the ends of the strip to provide scarfed portions, means for lowering the supporting means relative to the clamping means to avoid tension in the strip, means for moving the clamping means with the scarfed ends of the strip into overlapping abutting relation, and means for pressing together the overlapping ends of the strip to splice the same.

5. Apparatus as defined by claim 2 in which said pressing means comprises a plurality of spring tensioned fingers arranged in juxtaposed relation across the width of the strip.

6. Apparatus for splicing a strip of plastic material to provide an endless band, said apparatus comprising pairs of clamping jaws for receiving end portions of a strip extending therethrough, means for clamping said jaws upon said end portions, means for severing the ends of the strip at said jaws to provide scarfed ends, means for moving the clamped jaws with the ends of the strips to abut said scarfed ends in overlapping relation, and means for applying pressure to the overlapping ends in a direction normal to a face of the strip.

7. Apparatus for splicing a strip of plastic material to provide an endless band, said apparatus comprising pairs of clamping jaws for receiving end portions of a strip extending therethrough, means for clamping said jaws upon said end portions, means for severing the ends of the strip at said jaws to provide scarfed ends, means for rotatably moving said pairs of jaws toward each other to abut said scarfed ends in overlapping relation, and means for applying pressure to the overlapping ends in a direction normal to a face of the strip.

8. Apparatus for splicing a strip of plastic material to provide an endless band, said apparatus comprising pairs of clamping jaws for receiving end portions of a strip extending therethrough, means for clamping said jaws upon said end portions, means for severing the ends of the strip at said jaws to provide scarfed ends, means for rotatably moving said pairs of jaws toward each other to abut said scarfed ends in overlapping relation, and means for applying pressure to the overlapping ends in a direction normal to a face of the strip, said pressing means comprising a plurality of individually spring pressed fingers in juxtaposed relation with each other across a face of the strip, and means for forcing them against the strip as a group.

9. Apparatus for splicing a strip of plastic material to provide an endless band, said apparatus comrising pairs of clamping jaws for receiving end portions of a strip extending therethrough, means for clamping said jaws upon said end portions, means for severing the ends of the strip at said jaws to provide scarfed ends, means for rotatably moving said pairs of jaws toward each other to abut said scarfed ends in overlapping relation, pressing means for applying pressure to the overlapping ends in a direction normal to a face of the strip, said pressing means comprising a plurality of individually spring pressed fingers in juxtaposed relation with each other across a face of the strip, and means for forcing them against the strip as a group, said fingers having serrated pressing faces for engaging the spliced material.

10. Apparatus for splicing a tread slab to provide an endless tread band, said apparatus comprising means for supporting the slab intermediate the ends thereof and with the ends of the slab depending downward, means for individually gripping the depending ends, means for treating the depending ends of the slab while they are held by said gripping means, and means for swinging said gripping means inwardly toward one another and for splicing said ends together.

11. Apparatus for splicing a tread slab to provide an endless tread band, said apparatus comprising means comprising a curvilinear surface for supporting the slab with the ends thereof downwardly depending, and means for individually gripping and moving said ends of the slab inwardly toward one another and for splicing the same.

12. Apparatus for manipulating a strip of plastic material, said apparatus comprising means for supporting said strip intermediate the ends thereof with said ends depending downward, and means for individually gripping and moving an end inwardly toward the other end into juxtaposition therewith.

13. Apparatus for manipulating a strip of plastic material, said apparatus comprising means for supporting said strip intermediate the ends thereof with said ends depending downward, and means for individually gripping and moving the ends thereof toward each other into juxtaposition with each other.

14. Apparatus for manipulating a strip of plastic material, said apparatus comprising means for supporting said strip intermediate the ends thereof with its ends in substantially parallel relation, and means for individually gripping and moving the ends thereof toward each other into juxtaposition with each other.

15. Apparatus for manipulating a strip of plastic material, said apparatus comprising means for supporting said strip intermediate the ends thereof with its ends in substantially parallel relation, means for individually gripping the ends beyond said support, means for trimming said ends, and means for moving said ends toward each other into juxtaposition with each other.

16. Apparatus for manipulating a strip of plastic material, said apparatus comprising means for supporting said strip intermediate the ends thereof with its ends depending downward, means for individually gripping and moving the ends thereof toward each other into juxtaposition with each other, and means for adjusting said supporting means during the movement of said ends to relieve said strip from tension.

CHARLES W. LEGUILLON.
FRANK SLUSHER.

REFERENCES CITED

The following references are of record in the file of this patent:

UNITED STATES PATENTS

| Number | Name | Date |
|---|---|---|
| 1,041,201 | Turner | Oct. 15, 1912 |
| 2,389,725 | Gillis | Nov. 27, 1945 |